UNITED STATES PATENT OFFICE.

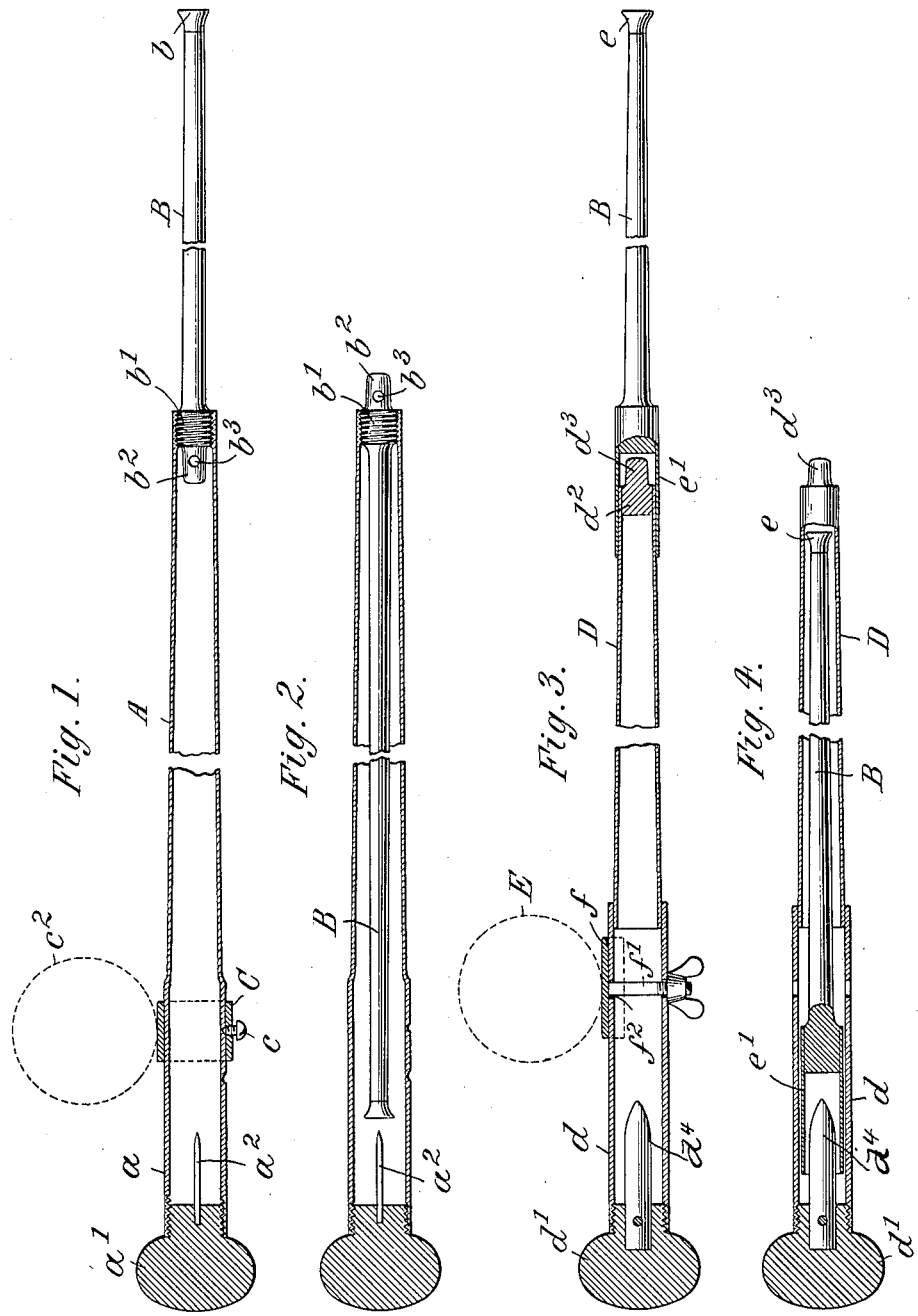

JEAN MARTIAL LOBIT, OF NEW YORK, N. Y.

COMBINED FISHING-ROD AND CANE.

No. 849,481. Specification of Letters Patent. Patented April 9, 1907.

Application filed July 3, 1906. Serial No. 324,681.

*To all whom it may concern:*

Be it known that I, JEAN MARTIAL LOBIT, a citizen of the Republic of France, residing at New York, in the county of Kings and State of New York, have invented certain new and useful Improvements in a Combined Fishing-Rod and Cane, of which the following is a specification, reference being had to the drawings accompanying and forming part of the same.

My invention relates to fishing-rods, and has for its object to provide a rod which can be collapsed or telescoped to a compact form and used as a cane or walking-stick.

A further object is to provide a device of this character which shall be simple and inexpensive in construction.

To these ends the invention consists in the novel features, arrangements of parts, and combinations of elements hereinafter described, and more particularly set forth in the claims.

In the annexed drawings, Figure 1 is a longitudinal section showing the devices extended for use as a fishing-rod. Fig. 2 is a similar section showing the device collapsed for use as a cane. Fig. 3 is a similar section showing a modification arranged for use as a fishing-rod, and Fig. 4 is a similar section showing the same adapted for use as a cane.

Referring now more particularly to Figs. 1 and 2, the body of the device is formed by a tapered tubular member A, preferably of metal, provided with a handle part $a$, of slightly larger diameter. At the smaller end the body or stock A is internally threaded to receive a tapering extension B, of smaller diameter than the stock, provided at its tip with the usual eyelet $b$ for the line. The end of the extension which enters the stock is provided with an enlargement $b'$, in which are cut the threads which engage those in the stock. The enlargement or plug $b'$ has a stud $b^2$ with a transverse perforation $b^3$. The stock is also internally threaded at the handle end to receive the threaded shank of a knob $a'$. From the shank projects a pin $a^2$ or other tool. On the stock, preferably on the handle portion, is a closely-fitting removable sleeve or ring C, held in place by a set-screw $c$, which enters a perforation or cavity $c'$ in the stock. This ring or sleeve carries the reel, (merely indicated by the dotted circle $c^2$.)

Assembled as shown in Fig. 1 the device is ready for use as a fishing-rod. To adapt it for use as a cane, the extension B is unscrewed and reversed, as in Fig. 2, the shank or enlargement $b'$ screwing into the end of the stock, as shown. The set-screw $c$ being loosened, the reel-sleeve may be slipped off the stock. The stud $b^2$ constitutes the stud or pin usually employed in the end of the cane. If from long disuse or other causes the extension becomes tightly set in the stock, the pin $a^2$ on the knob $a'$ may be inserted in the aperture $b^3$ and used as a wrench to unscrew the extension.

The arrangement shown in Fig. 2 is convenient for carrying the device on fishing trips; but when the device is to be used simply as a walking-stick the extension may be removed entirely and a mere plug, of suitable size and form, (not shown,) may be screwed into the stock, as will be readily understood.

In the modification shown in Fig. 3 the stock D has an enlarged handle part $d$, closed by a screw-knob $d'$, as in the first case. The other end of the stock, however, is permanently closed by a plug $d^2$, provided with the usual stud $d^3$. The extension E is provided with an eyelet $e$ at its smaller end for the line and at its other end with a socket $e'$, adapted to fit securely, but removably, over the smaller end of the stock. The reel (indicated by the dotted circle F) is carried by a curved plate $f$, fitting the handle portion of the stock and provided with a screw-bolt $f'$, extending through alined apertures $F^2 f^2$ in the stock. On the protruding end of the bolt is a wing-nut $f^3$, by which the reel-plate may be firmly secured in position.

When the device is to be knocked down, the reel is removed by unscrewing the wing-nut and withdrawing the bolt and the extension is slipped off the stock. If desired, the knob $b'$ can be removed and the extension slid small end foremost into the stock, whereupon the knob may be replaced, as in Fig. 4. Inasmuch as in this construction the pin $a^2$ of Fig. 1 is not needed, it may be replaced by another tool, as the knife-blade $d^4$. When the parts are assembled as in Fig. 4, the knife enters the socket $e'$ of the extension $e$.

From the foregoing it will be seen that my invention provides a fishing-rod which, for convenience in carrying, may be quickly and easily collapsed to the form of a cane or walking-stick. I am aware that devices of the same general character have been proposed before, and I therefore do not claim that plan broadly; but

What I claim is—

1. In a combined fishing-rod and cane, the combination of a tubular stock, an extension adapted to be secured at one end of the stock or to be stored within the stock as desired, a removable closure for the other end of the stock, a tool carried by the closure, and a reel-carrier removably secured to the stock, as set forth.

2. In a combined fishing-rod and cane, the combination of a tapering tubular stock having an enlarged handle portion at one end, a tapering extension adapted to be secured at the other end of the stock or to be stored within the stock as desired, a removable screw-closure for the handle end of the stock, carrying a tool within the stock, a reel-carrier fitting the handle portion of the stock, and a screw device for removably securing the reel-carrier in position, as set forth.

JEAN MARTIAL LOBIT.

Witnesses:
M. LAWSON DYER,
S. S. DUNHAM.